United States Patent
Watt et al.

(10) Patent No.: US 7,675,702 B2
(45) Date of Patent: Mar. 9, 2010

(54) REDUCED CONVOLUTION FOR REPETITIVE DISTURBANCE REJECTION

(75) Inventors: Charles R. Watt, Longmont, CO (US); Xiao Zhang, Longmont, CO (US); John W. Vanlaanen, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 341 days.

(21) Appl. No.: 11/752,684

(22) Filed: May 23, 2007

(65) Prior Publication Data

US 2007/0273996 A1     Nov. 29, 2007

Related U.S. Application Data

(60) Provisional application No. 60/803,117, filed on May 24, 2006.

(51) Int. Cl.
    *G11B 5/02*     (2006.01)

(52) U.S. Cl. .......................................... 360/51; 360/75
(58) Field of Classification Search .................. None
    See application file for complete search history.

(56) References Cited

U.S. PATENT DOCUMENTS

| | | | | |
|---|---|---|---|---|
| 5,745,315 | A * | 4/1998 | Aoyama ....................... 360/65 |
| 6,744,591 | B2 * | 6/2004 | Nakagawa et al. ........ 360/78.09 |
| 6,775,084 | B1 * | 8/2004 | Ozdemir et al. ............... 360/55 |
| 7,149,048 | B1 * | 12/2006 | Ray et al. ................. 360/77.04 |
| 7,230,789 | B1 * | 6/2007 | Brunnett et al. ............... 360/75 |
| 7,280,304 | B2 * | 10/2007 | Wu ............................. 360/75 |

* cited by examiner

*Primary Examiner*—Jason C Olson
(74) *Attorney, Agent, or Firm*—David K. Lucente

(57) ABSTRACT

Methods according to some embodiments include writing servo patterns on a data storage medium including a plurality of timing patterns in response to phase correction values generated using a phase correction value (PCV) kernel having a length that is less than the number of timing patterns on the data storage medium.

20 Claims, 11 Drawing Sheets

REDUCED CONVOLUTION FOR REPETITIVE DISTURBANCE REJECTION

RELATED APPLICATION

This application claims the benefit of and priority to U.S. Provisional Patent Application No. 60/803,117, filed May 24, 2006, the disclosure of which is hereby incorporated herein by reference as if set forth in its entirety.

FIELD

The present invention generally relates to phase-locked clock circuits, and more particularly to adjusting timing of a disk-locked clock circuit during writing of servo patterns on a disk.

BACKGROUND

Disk drives are commonly used in microprocessor based electronic devices, such as workstations, personal computers, laptops and other computer systems, to store and retrieve large amounts of data. A typical disk drive includes a plurality of magnetic disks that are rotated by a spindle motor and an actuator arm assembly that includes read/write heads mounted to flexure arms. An actuator motor (e.g., voice coil motor) can rotate the flexure arms and heads about a pivot bearing relative to the disks. The heads are configured to fly upon air bearings in very close proximity to the rotating disks.

The surface of each disk is divided into a series of data tracks which are spaced radially from one another across a band having an inner diameter and an outer diameter. The data tracks extend circumferentially around the disks and store data in the form of magnetic flux transitions on the disk surfaces. Each data track is divided into a number of data sectors that store fixed sized blocks of user data. Embedded among the data sectors on each track are servo fields that define servo information that enables the disk drive to control the radial position of the heads relative to tracks on the disks and to determine the circumferential location of the heads.

The servo fields may be written to the disks during the manufacture of a disk drive using a highly precise servo track writer, which utilizes the heads of the disk drive to write the servo fields. Because the servo fields are used to define the radial locations of tracks and the location of data along a track, it is important to precisely control the locations on the disk surfaces at which the servo fields are written. Thus, a typical servo track writer includes a precise clock signal generator and an additional recording element that is used to write a reference clock pattern on a disk surface responsive to the clock signal. The reference clock pattern is then read back from the disk surface by the additional recording element to generate a disk reference clock signal synchronized to the rotation of the disks, which is used to determine where to write the servo fields through the read/write heads onto the disks.

Disk drives have been developed that self-servo write the servo patterns without a servo writer. For example, an incremental two-pass self-servo write process begins with a first pass that writes reference servo patterns at a position determined by a crash-stop (the mechanical limit of the head's movement) and then servos on the reference servo patterns and writes the next set of reference servo patterns. The first pass repeats as the head moves radially across the disk, with each step servoing on the previously written reference servo patterns to write the next reference servo patterns at the next radial position. During the first pass, the servo loop has no absolute reference to ensure placement of the reference servo patterns at the appropriate radius. After the first pass finishes the complete stroke, a second pass writes the final servo patterns using the reference servo patterns to find the appropriate positions. However, the second pass substantially increases the self-servo writing time.

In some disk drives, spiral patterns are written onto the disk, and the disk drive self-writes servo patterns on the disk using the spiral patterns as a reference for servoing the head. For example, 100-200 spirals may be written onto the surface of the disk. The spirals generally form an outwardly-expanding pattern from an inner diameter of the disk to an outer diameter of the disk. However, there may be small variations in the circumferential spacing of the spirals. Some aspects of these variations are predictable, however, because the variations repeat with each revolution of the disk. Such variations may cause the servo patterns to be written at incorrect locations on the disk. Accordingly, when self-writing the servo patterns on the disk, it is desirable to predict and account for these variations.

SUMMARY

Methods according to some embodiments include writing servo patterns on a data storage medium including a plurality of timing patterns in response to phase correction values generated using a phase correction value (PCV) kernel having a length that is less than the number of timing patterns on the data storage medium.

DETAILED DESCRIPTION

The present invention now will be described more fully hereinafter with reference to the accompanying drawings, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings.

The present invention may be embodied in hardware and/or in software (including firmware, resident software, microcode, etc.). Consequently, as used herein, the term "signal" may take the form of a continuous waveform and/or discrete value(s), such as digital value(s) in a memory.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
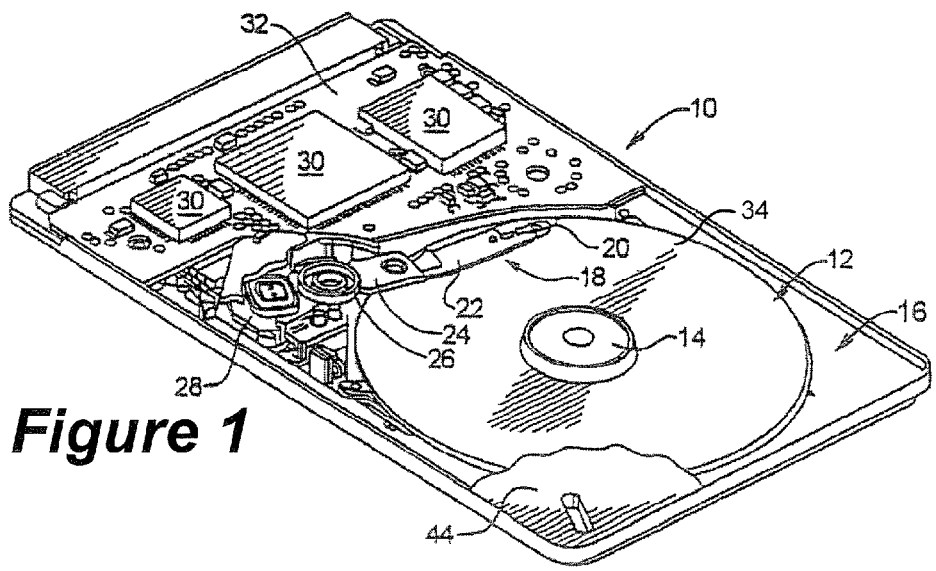
FIG. 1 is a perspective view of a disk drive with electronic circuits that are configured in accordance with some embodiments.
Figure 2:
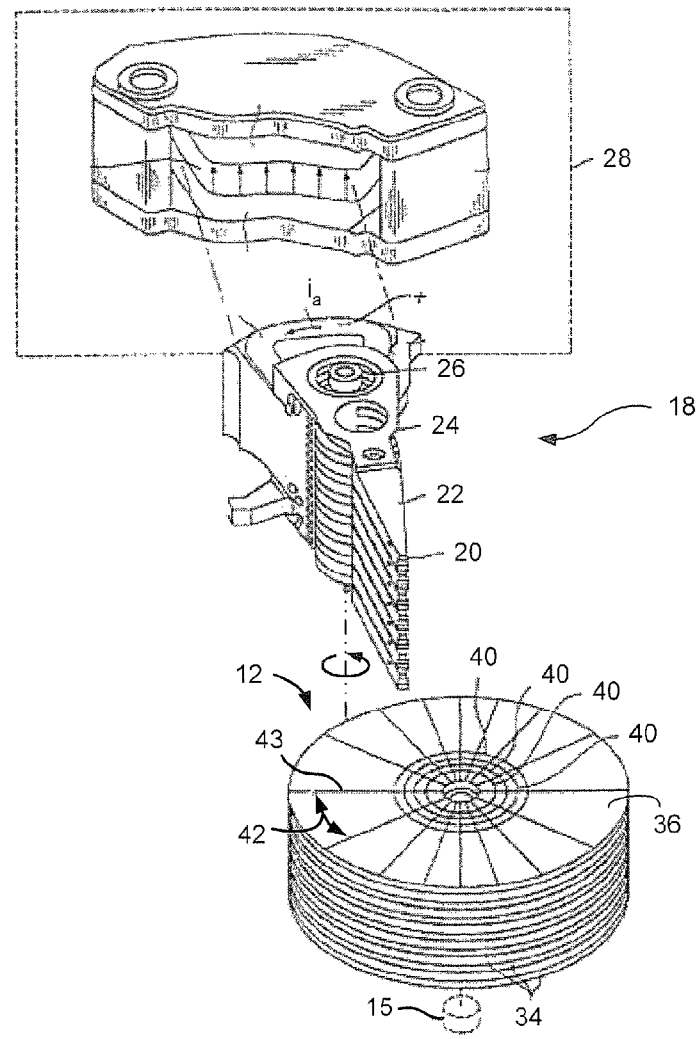
FIG. 2 is a block diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk 34 in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
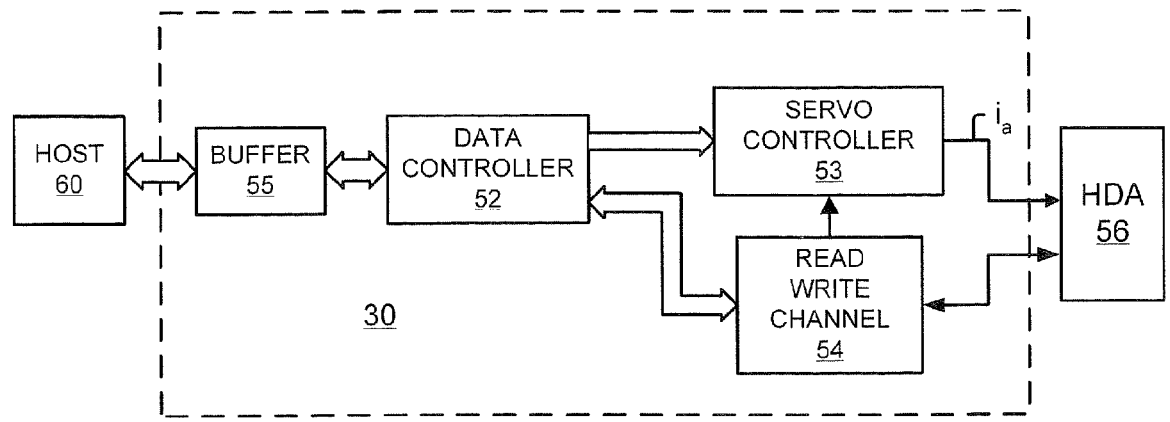
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although the controllers 52, 53, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces of the disks 34, the VCM 28, and the spindle motor 15.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34 by applying an actuator current signal $i_a$ to the VCM 28, and to maintain the head 20 aligned with the track while data is written/read on the disk 34.

Figure 4:
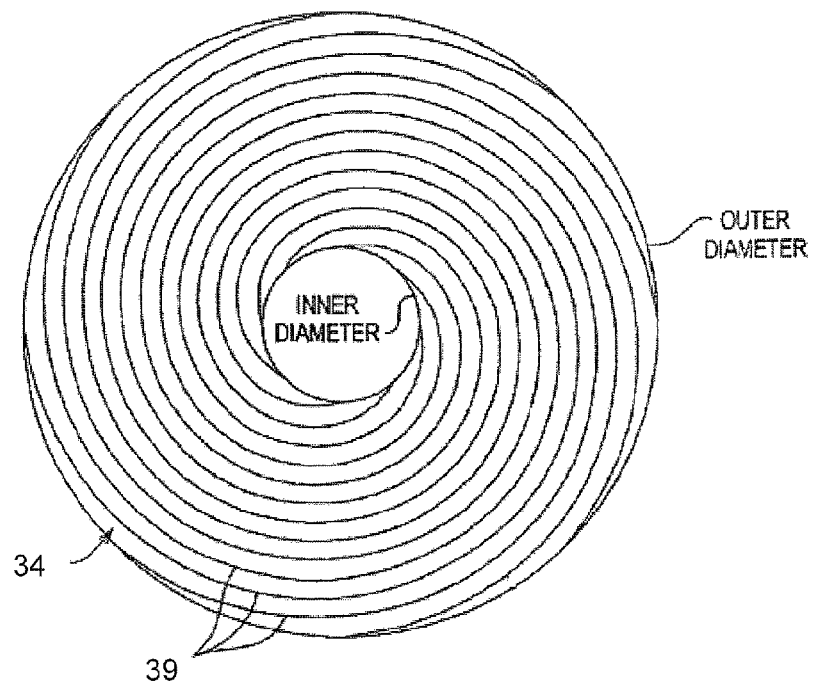
FIG. 4 shows a disk including spiral reference patterns.

As noted above, some disk drives are configured to write servo patterns on the disk 34 using spiral patterns 39 on the disk 34 as a timing reference for writing the servo patterns, as shown in FIG. 4. The spirals 39 generally form an outwardly-expanding pattern from an inner diameter of the disk 34 to an outer diameter of the disk 34. Using a phase-locked loop system, the output of a clock may be locked to spiral crossings to produced a disk-locked clock (DLC) with a frequency higher than a frequency of measured spiral crossings. The DLC may be used to write the servo patterns on the disk surface. However, there may be small variations in the circumferential spacing of the spirals, which may cause the servo patterns to be written at incorrect locations on the disk. Accordingly, when self-writing the servo patterns on the disk, it is desirable to predict and account for these variations.

Variations in spiral locations may be compensated at servo writing time by generating phase correction values (PCV) that may be used to correct phase errors in a disk-locked clock (DLC) that is synchronized to the spiral crossings. The phase correction value is a number that describes how any one individual spiral is displaced from an ideal location. At a given radius, the ideal spacing between spirals may be equal to the circumference divided by the number of spirals on the disk. At a given radius, the phase correction values may be related to timing correction values (TCV) which indicate how any one individual spiral crossing is displaced in time from an ideal crossing time, based on the angular velocity of the disk.

PCV values may be calculated using a convolution-based system, in which corrected phase errors are convolved with values contained in a PCV kernel. Because these calculations are complicated and must be performed continuously during servo writing, they are highly computationally intensive and demand a large amount of processing power. Moreover, because of the nature of the calculations involved, it is desirable to store the phase error and the PCV kernel values in a tightly coupled memory, such as an on-board memory cache, that can be rapidly accessed by the processor. However, such memory may be expensive.

Figure 5:
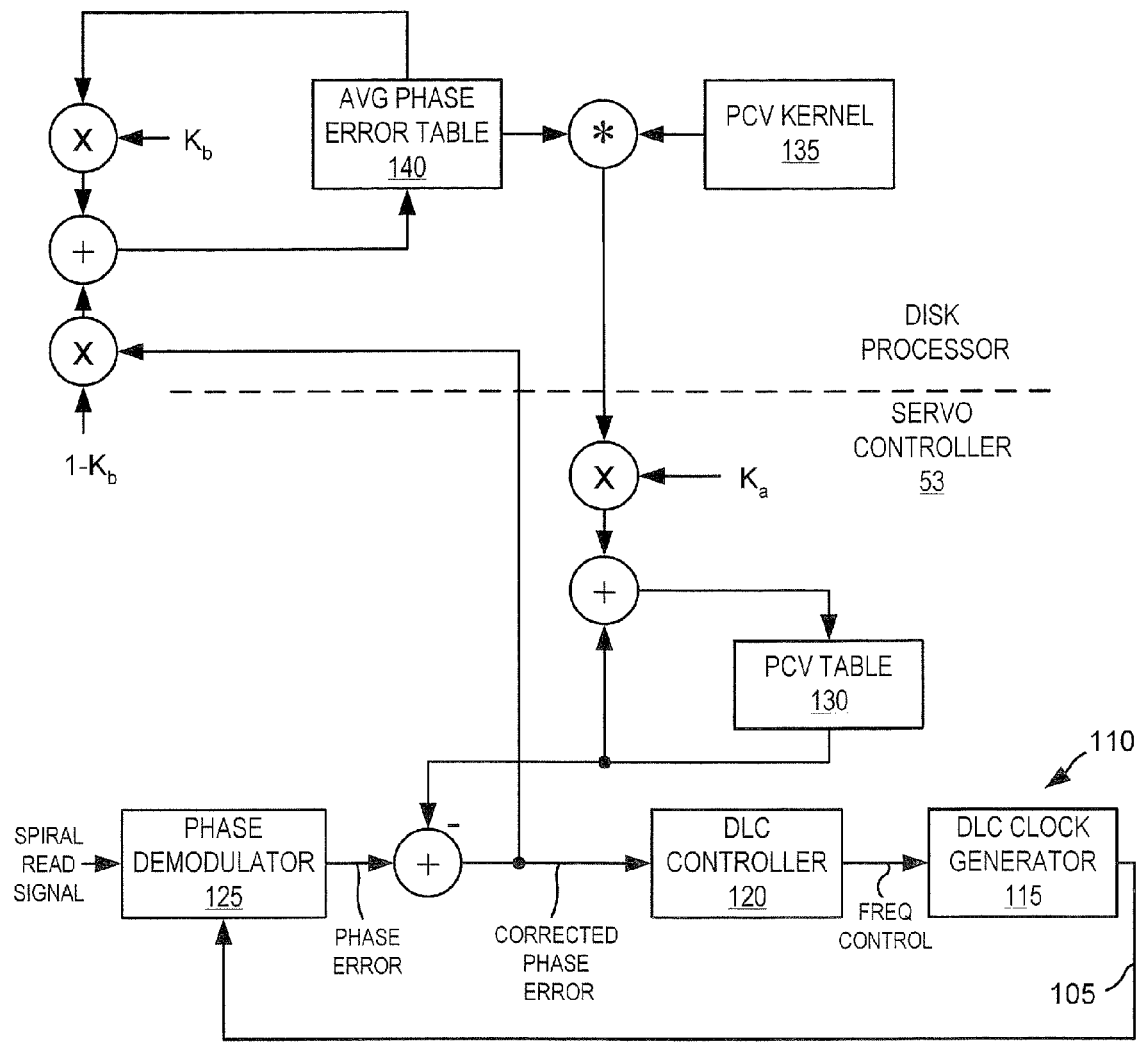
FIG. 5 is a block diagram illustrating systems/methods for compensating position errors in reference patterns during servo writing operations.

For example, timing correction values may be calculated using a convolution-based system as shown in FIG. 5. As shown therein, a disk-locked clock (DLC) 110 for use in writing servo patterns includes a DLC clock generator 115 that generates a clock signal 105 having a frequency that is controlled by a frequency control signal provided by a DLC controller 120. The frequency control signal may be determined in response to a phase error signal generated by a phase demodulator 125 in response to the clock signal and a spiral read signal from the read/write head 20 of the disk drive. In addition, the phase error is adjusted by subtracting PCVs output for each spiral by a PCV table 130. Timing control values are generated by convolving phase errors, which may be average phase errors, output by the phase demodulator 125 with timing correction kernel values contained in a PCV kernel storage 135. The resulting values are multiplied by a weight $K_a$ before being added to the PCV table 130.

The convolution operation is performed in order to decompose the DLC phase error at a given sample into two components: (a) the external timing disturbance at the current sample and (b) the timing error at the current sample produced by the DLC loop's response to previous timing errors. The timing disturbances can be further broken down into two parts: repeatable errors and non-repeatable errors. Repeatable errors can be separated from non-repeatable errors by averaging the errors over multiple revolutions. PCV values help to identify the repeatable errors.

The corrected phase error, which is equal to the phase error output by the phase demodulator 125 less the timing correction value obtained from the PCV table 130, is used by the DLC controller 120 to determine a new value for the frequency control signal. Accordingly, servo patterns may be correctly written, even though the timing of spiral measurements may be displaced from ideal locations.

As shown in FIG. 5, the average phase errors used in the convolution operation may be obtained from an average phase error table 140. Average phase errors are obtained by taking the corrected phase error from the phase demodulator 125 for a particular spiral. The corrected phase error is multiplied by a weight $(1-K_b)$, while the existing average phase error for the spiral is multiplied by $K_b$. The results are summed and stored in the average phase error table 140 as the new average phase error.

The convolution operation is performed once for every spiral, which may use substantial processing capacity. At each sample, the convolution operation executes a multiply and add operation for every DLC sample in one revolution of the disk.

Because the convolution calculations are highly computationally intensive and must be performed continuously during servo writing, they demand a large amount of processing power. Thus, as indicated in FIG. 5, the convolution operation may be performed in a separate processor from the servo controller 53. Moreover, because of the nature of the calculations involved, the average phase error table 140 and the PCV kernel 135 may require a large amount of a tightly coupled memory, such as an on-board memory cache or other zero-wait state memory that can be rapidly accessed by the processor. However, such memory may be expensive.

Figure 6:
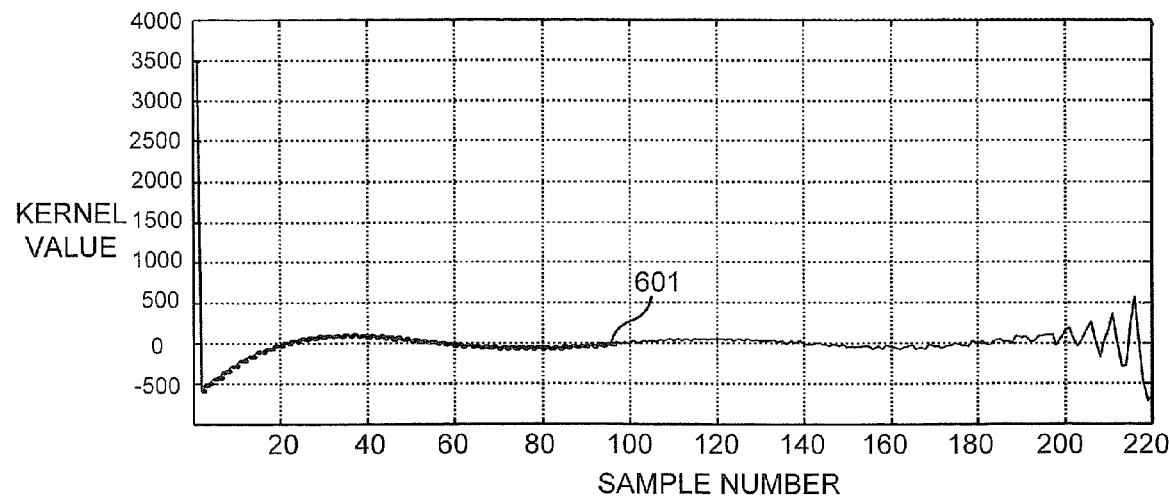
FIG. 6 is a graph of a full-length PCV kernel.

An example of a PCV kernel 601 is shown in FIG. 6. As shown therein, the kernel coefficients generally become smaller the further they are away from the current sample. Typically, the coefficients are near zero at one-half revolution from the current sample. The graph of FIG. 6 shows a PCV kernel 601 with 220 kernel values, with sample number 1 being the current sample. Thus the samples nearest the current sample are about samples 1-55 and 166-220. Samples 56-165 are near zero in value.

Some embodiments may reduce the computational burden associated with calculating PCV values using a PCV kernel. In particular embodiments, some values of a PCV kernel may be set to zero, so that the number of multiply/add operations in the convolution can be reduced. If a significant number of kernel coefficients can be set to zero, the computation time and/or amount of tightly coupled memory used in the convolution operation can be reduced. However, forcing some values of the PCV kernel to zero may introduce unwanted frequency components in the PCV kernel spectrum. According to some embodiments, other non-zero values of the kernel may be adjusted to reduce the unwanted frequency components.

Figure 7:
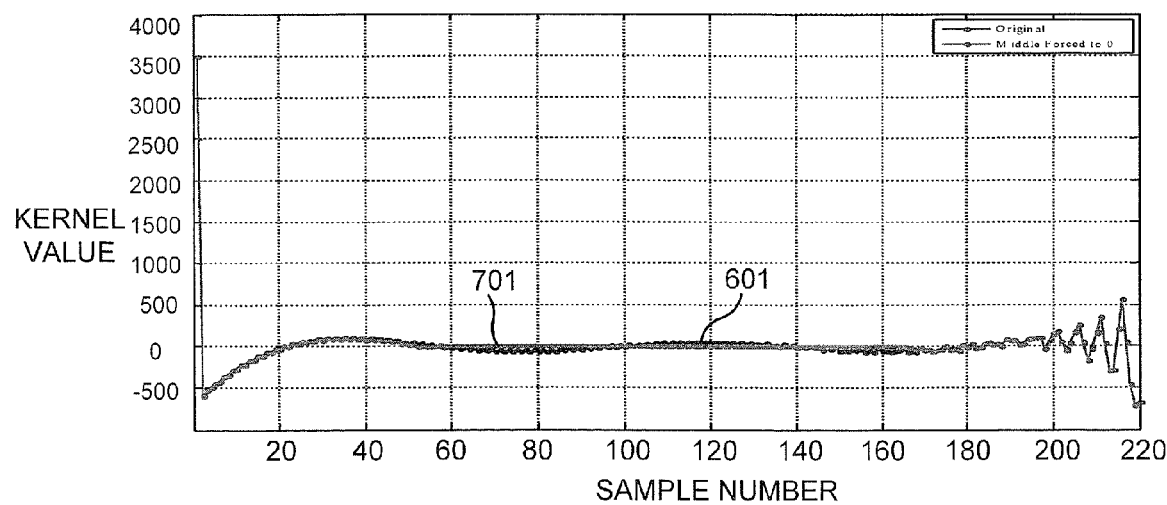
FIG. 7 is a graph of a full-length PCV kernel and a modified PCV kernel having middle values set to zero.

For example, FIG. 7 is a graph of the example kernel 601 along with a modified kernel 701 in which values near the center of the kernel 701 have been set to zero. The use of a kernel having a number of zero values in the PCV convolution operation may proportionally reduce the number of multiply/add operations performed. However, the use of such a kernel can have some drawbacks.

For example, forcing the values in the middle of the kernel to zero may introduce gain at low frequencies of the kernel spectrum (e.g. at the 1F and 2F frequencies that are 1 and 2 times the fundamental frequency of rotation, respectively). The kernel estimates a "plant" that includes the servo control feedback system. The plant may not well behaved at very low frequencies, especially the 1F and 2F frequencies. Having non-zero response at these frequencies in the PCV kernel can mean that the system may not respond well to disturbances at those frequencies.

Figure 8:
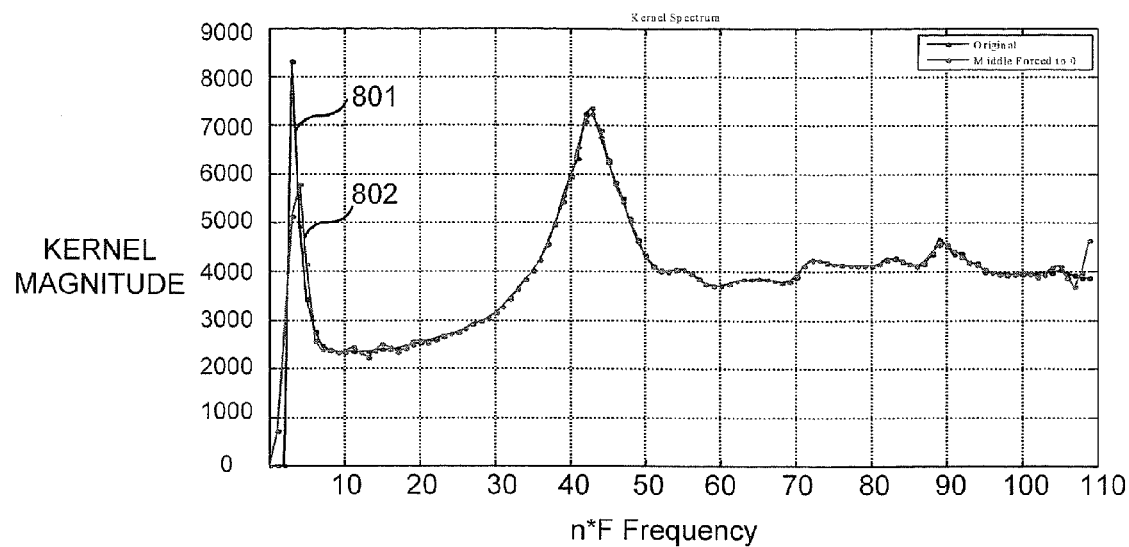
FIG. 8 is a graph of the spectra of a full-length PCV kernel and a modified PCV kernel having middle values set to zero.

The spectra of the sample kernel 601 and the zero-forced kernel 701 are shown in FIG. 8. The spectrum of the sample kernel 601 is shown as curve 801, while the spectrum of the zero-forced kernel 701 is shown as curve 802. As can be seen in FIG. 8, the spectrum 801 of the sample kernel 601 has zeros at the 1F and 2F positions, while the spectrum 802 of the zero-forced kernel 701 has non-zero values at those frequencies. Thus, simply forcing the middle values of the PCV kernel to zero may introduce undesirable frequency components into the kernel.

According to some embodiments, some values of a PCV kernel are set to zero, and then other values of the PCV kernel are adjusted to reduce unwanted frequency components in the kernel. Some embodiments may adjust the non-zero values of the PCV kernel by defining a cost function and selecting PCV kernel values that reduce or minimize the cost function. Further embodiments may adjust the non-zero PCV kernel values by iteratively setting the frequency components of a PCV kernel at selected frequencies to zero, followed by setting kernel values of the PCV kernel to zero, until a PCV kernel having both zero-set values and acceptable frequency component levels is obtained. The iterative approach will be described first, followed by the cost function approach.

An iterative approach to obtaining a desired PCV kernel may arise from a recognition that when values of a PCV kernel are set to zero, undesired frequency components may be introduced into the PCV kernel at low frequencies. If the unwanted low frequency components are simply removed, non-zero kernel values may be introduced back into the PCV kernel. However, the kernel values introduced back into the kernel may be smaller in magnitude than the kernel values that were removed when the kernel values were initially set to zero.

Figure 9:
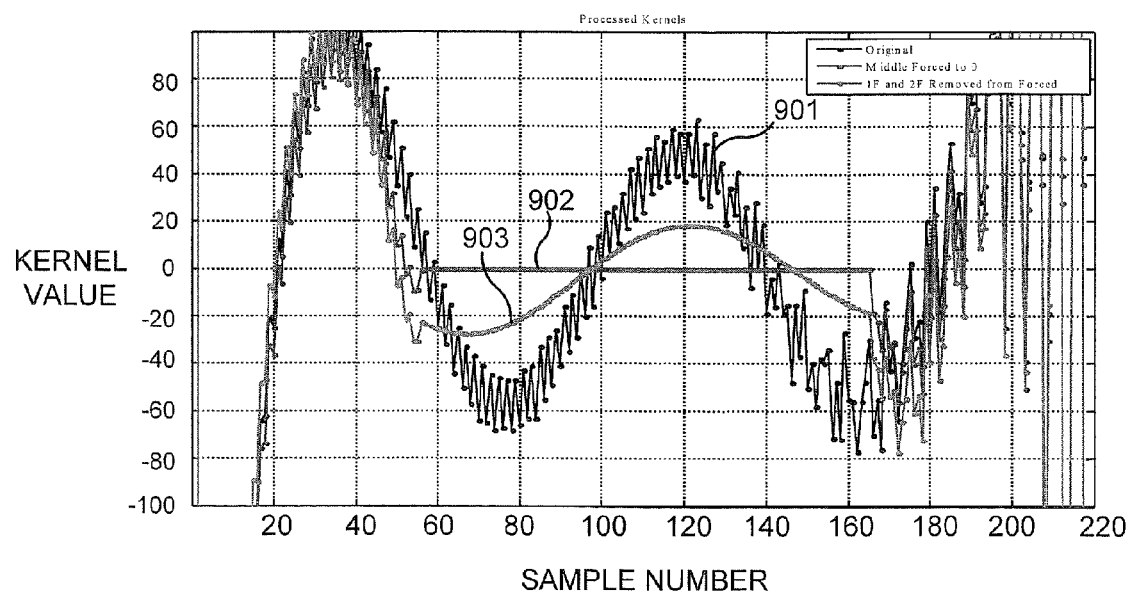
FIG. 9 is a magnified graph of a full-length PCV kernel, a modified PCV kernel having middle values set to zero, and a modified PCV kernel from which 1F and 2F frequency components have been removed.

For example, FIG. 9 is a magnified graph of three 220-sample PCV kernels. Curve 901 plots a kernel that includes non-zero values but has zero frequency components at the 1F and 2F frequencies. Curve 902 is a plot of a kernel having samples 56-165 set to zero, and the remaining values adjusted to remove any DC content. If the 1F and 2F components of the kernel of curve 902 are removed (i.e. et to zero), non-zero kernel values are added back to the kernel values that were previously set to zero (i.e. samples 56-165), resulting in the kernel of curve 903.

However, it is noted that the new non-zero kernel values in samples 56-165 of kernel 903 are smaller than the kernel values of the same samples in the original kernel of curve 901, Accordingly, in some embodiments, the values of samples 56-165 of kernel 903 may again be set to zero. The frequency components at the frequencies of interest, e.g. the 1F and 2F frequencies, are then examined. If the frequency components at those frequencies are acceptable, for example, if the frequency components are less than a threshold level, the kernel may be used as the PCV kernel. Otherwise, the process may be repeated until the frequency components of the kernel are acceptable.

Figure 10:
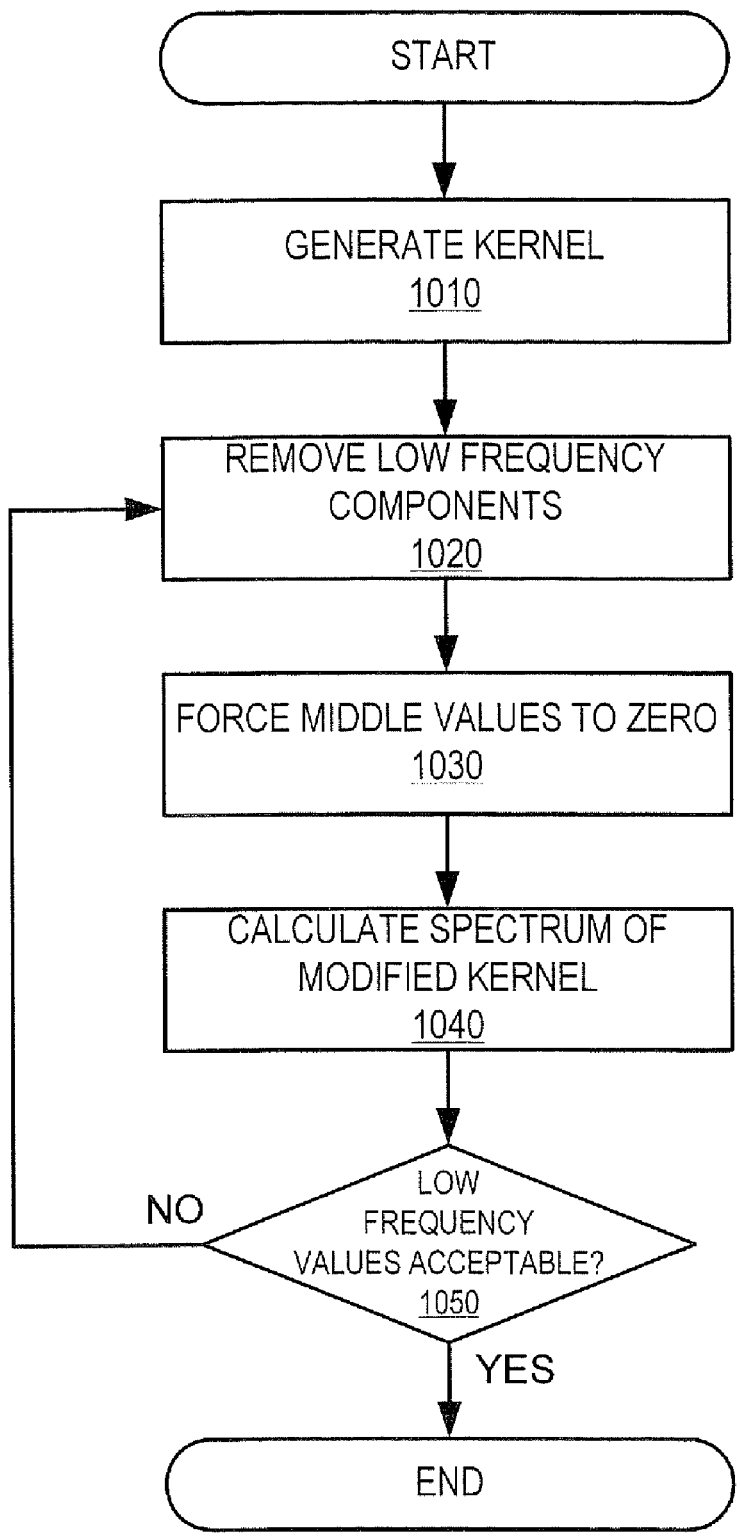
FIG. 10 is a flowchart illustrating operations according to some embodiments.

FIG. 10 is a flowchart illustrating operations according to some embodiments. As shown therein, an initial kernel is generated (Block 1010), and the 1F and 2F components of the kernel are removed (Block 1020). Middle values of the kernel (i.e. values of the kernel that are relatively distant from the current sample), are set to zero (Block 1030). The spectrum of the modified kernel is then examined. In particular, low frequency components of the modified kernel, such as the 1F and 2F frequency components of the modified kernel are determined (Block 1040) and compared to one or more thresholds (Block 1050). For example, the 1F frequency component could be compared to a first threshold and the 2F frequency component could be compared to a second threshold to determine if the components are within acceptable limits. Alternatively, the 1F frequency component and the 2F frequency component could be compared to a single threshold.

If the low-frequency components are within acceptable limits, the process concludes, and the resulting kernel is used as the PCV kernel. However, if the low-frequency components are not within acceptable limits, the process returns to Block 1020, and the low-frequency components are again removed. The process may iterate until an acceptable kernel is produced.

Figure 11A:
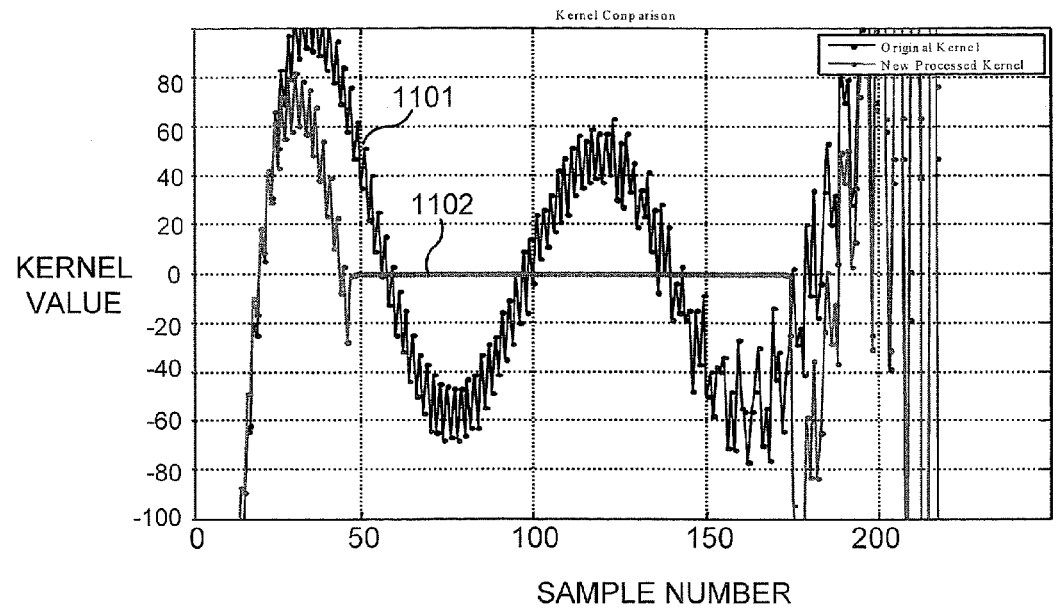
FIG. 11A is a graph of an original PCV kernel and a modified PCV kernel.

FIG. 11A is a graph of a kernel generated after 100 iterations of the process illustrated in FIG. 10. In FIG. 11A, the original kernel is plotted as curve 1101, while the iteratively-modified kernel is plotted as curve 1102. It is observed that middle kernel values of the iteratively-modified kernel 1102 are zero.

Figure 11B:
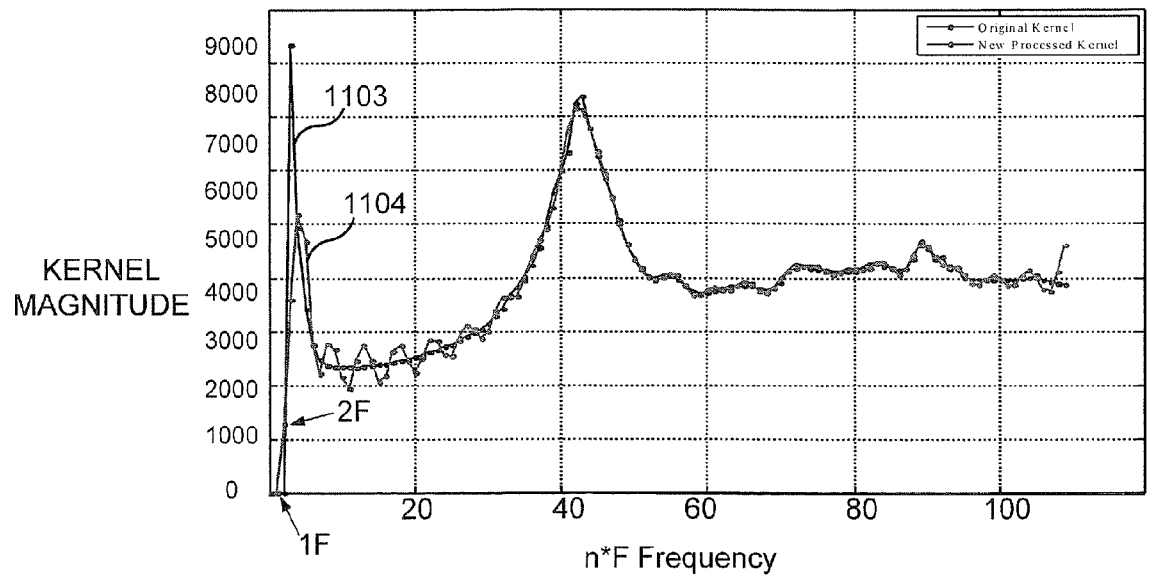
FIG. 11B is a graph of the spectra of the original PCV kernel and the modified PCV kernel of FIG. 11A.

FIG. 11B is a graph of the spectra of the original kernel and the modified kernel shown in FIG. 11A. In FIG. 11B, curve 1103 is a graph of the spectrum of the original kernel 1101, while curve 1104 is a graph of the spectrum of the iteratively-modified kernel 1102. It is observed that the 1F frequency component of the modified kernel spectrum 1104 is near zero. The 2F frequency component of the modified kernel spectrum is 1104 relatively low, but is not completely removed. However, both the 1F and 2F frequency components may be within acceptable limits.

A cost function-based approach may be used to generate a PCV kernel according to some embodiments. In some embodiments, middle values of a PCV kernel may be set to zero. A cost function may be defined, and non-zero values of the PCV kernel may be adjusted by selecting PCV kernel values that reduce or minimize the cost function.

For a disk having N spirals, the original kernel can be expressed as $k_o(n)$, where $n=0, 1, \ldots, N-1$. In the frequency domain, the original kernel can be represented by $K_o(f_i)=F\{k_o(n)\}$, where $i=0, 1, \ldots, N-1$, and $$f_i = \frac{RPM}{60} \times i.$$

RPM represents the angular velocity of the disk in revolutions per minute.

A new kernel $k_p(n)$ having a spectrum $K_p(f_i)=F\{k_p(n)\}$ may be defined. The new (modified) kernel $k_p(n)$ may be subject to the following constraints:

$$k_p(n)=0 \text{ for } L_1 \leq n \leq L_2 \tag{1}$$

$$K_p(f_{i=0})=0 \tag{2}$$

$$|K_p(f_i)| \leq \epsilon_i \text{ for } i=1 \text{ to } I_z \tag{3}$$

$$\max|K_p(f_i)-K_o(f_i)| \leq \epsilon_{other} \text{ for } i=I_z+1 \text{ to } N-1 \tag{4}$$

According to constraint equation (1), the values of the modified kernel $k_p(n)$ are set to zero for some samples falling in the interval $[L_1, L_2]$. As in the embodiments discussed above, this interval includes samples that are relatively distant from the current sample for which the convolution operation is being performed.

According to constraint equation (2) the spectrum $K_p(_0)$ of the modified kernel has no DC component. That is, the frequency component at frequency $f=0$ is zero.

According to constraint equation (3), for low frequency components, i.e. for frequency components at $i=1$ up to $i=I_z$, the magnitude of the spectrum of the modified kernel $K_p(f_i)$ is less than a threshold amount $\epsilon_i$, which may be different for each frequency component of interest.

According to constraint equation (4), for frequencies above $i=I_z$, the maximum difference between the original spectrum $K_o(f_i)$ and the spectrum $K_p(f_i)$ of the modified kernel is less than some threshold $\epsilon_{other}$.

Next, a difference function $d(n)$ is defined as an estimate of the difference between the original kernel $k_o(n)$ and the modified kernel $k_p(n)$, as follows:

$$d(n) = \begin{cases} \alpha_1 \cdot n^M + \alpha_2 \cdot n^{M-1} + \ldots + \alpha_M \cdot n & \text{for } n = [0, L_1-1] \\ -k_o(n) & \text{for } n \in [L_1, L_2] \\ \beta_1 \cdot n^M + \beta_2 \cdot n^{M-1} + \ldots + \beta_M \cdot n + \beta_{M+1} & \text{for } n = [L_2, N-1] \end{cases} \tag{5}$$

Accordingly, equation (5) defines a piecewise function including polynomial curve-fitting functions that estimate a difference between the original kernel $k_o(n)$ and the modified kernel $k_p(n)$. The $d(n)$ function is defined as a function so that cost function optimization can be performed using the modified kernel. Alternatively, the modified kernel $k_p(n)$ itself could be modeled using a polynomial equation or set of equations. However, defining a set of optimization parameters on the difference function $d(n)$ may be preferable because it may have lower variation and may be easier to approximate with polynomials.

Note that the constraint equation (2) can be expressed in the time domain as $$\sum_{n=0}^{N-1} d(n) = 0 \tag{6}$$

since, if there is no DC component, the kernel values should sum to zero.

A kernel spectrum difference function $\Delta K$ may be defined as the difference between the kernel spectrum components of the original kernel and the modified kernel, as follows:

$$\Delta K(f_i) = |K_p(f_i) - K_o(f_i)| \tag{7}$$

Finally, a cost function $\Psi$ may be defined. The cost function $\Psi$ may, in some embodiments, include a sum of weighted factors that take into account such items as the difference between the kernel spectra at low frequencies, the spectral distortion at other frequencies and/or the discontinuity between different sections of the difference function. For example, in some embodiments, the cost function $\Psi$ can be defined as follows:

$$\Psi = \mu_1 \times \sum_{i=1}^{I_z} \Delta K(f_i) + \mu_2 \times |\Delta K(f_{I_z+1}) - \varepsilon_{other}| + \mu_3 \times \max\left[\max_{n=L_1-3}^{L_1+3}|\Delta d(n)|, \max_{n=L_2-1}^{L_2+3}|\Delta d(n)|\right] \tag{8}$$

where $\mu_1$, $\mu_2$, and $\mu_3$ are weighting coefficients and $\Delta d(n)$ is the differential of $d(n)$. Since $d(n)$ is a function with 3 segments, the $\Delta d(n)$ term describes the discontinuity of the $d(n)$ function around the connection point between segments. In equation (8), the $\mu_1$ term attempts relates to frequency components at low frequencies (i.e. up to $I_zF$). The $\mu_2$ term relates to the distortion to other frequency components, while the $\mu_3$ term relates to discontinuity between different sections of the kernel. That is, the $\mu_3$ term is used in the cost function to limit the discontinuity of $d(n)$ between its segments. Without this control, the optimized result of $d(n)$ function may have a large discontinuity, which will result in the modified kernel having a large discontinuity around the connection point of each segment.

Accordingly, the optimization problem can be expressed as finding a set of parameters $\{\alpha_{1:M}, \beta_{1:M+1}\}$ that reduces/minimizes the cost function $\Psi$ under the constraints in the constraint equations (1) to (4) and the following additional constraints:

$$|K_p(f_{I_z+1}) - K_o(f_{I_z+1})| \leq \varepsilon_{I_z+1} \tag{9}$$

$$\max_{n=0}^{N-1}|d(n)| < \delta \tag{10}$$

$$\max_{n=L_1-3}^{L_1+1}|\Delta d(n)| < \frac{\delta}{2} \tag{11}$$

$$\max_{n=L_2-1}^{L_2+3}|\Delta d(n)| < \frac{\delta}{2} \tag{12}$$

Constraint equation (9) limits the distortion in the first non-zero component in the original kernel spectrum. Constraint equation (10) limits the kernel difference to a value $\delta$.

Constraint equations (11) and (12) limit the discontinuity from section 1 to section 2 of the kernel difference function, and from section 2 to section 3 of the kernel difference function, respectively.

Values for the weights $\mu_1$, $\mu_2$, and $\mu_3$ can be selected based on the importance that is attached to the various terms of the cost function. In some embodiments, the weights $\mu_1$, $\mu_2$, and $\mu_3$ can be selected such that $\mu_1 = \mu_2 = \mu_3$. However, in some cases, it may be desirable to weight one term more heavily than another. For example, in some embodiments, $\mu_1 = 0.92$, $\mu_2 = 0.07$, and $\mu_3 = 0.01$.

Once appropriate values for the weights $\mu_1$, $\mu_2$, and $\mu_3$ have been selected, the set of parameters $\{\alpha_{1:M}, \beta_{1:M+1}\}$ can be obtained numerically using a constrained nonlinear optimization technique, for example using the *fmincon* function in MATLAB®, which finds the constrained minimum of a scalar function of several variables starting at an initial estimate.

The performance of the resulting kernel can then be evaluated to determine how well the system reacts to disturbances at various frequencies. In some cases, the response of the system to a disturbance at the 3F frequency may provide a good comparison point for comparing the performance of a modified kernel with an original (full length) kernel.

Figure 12:
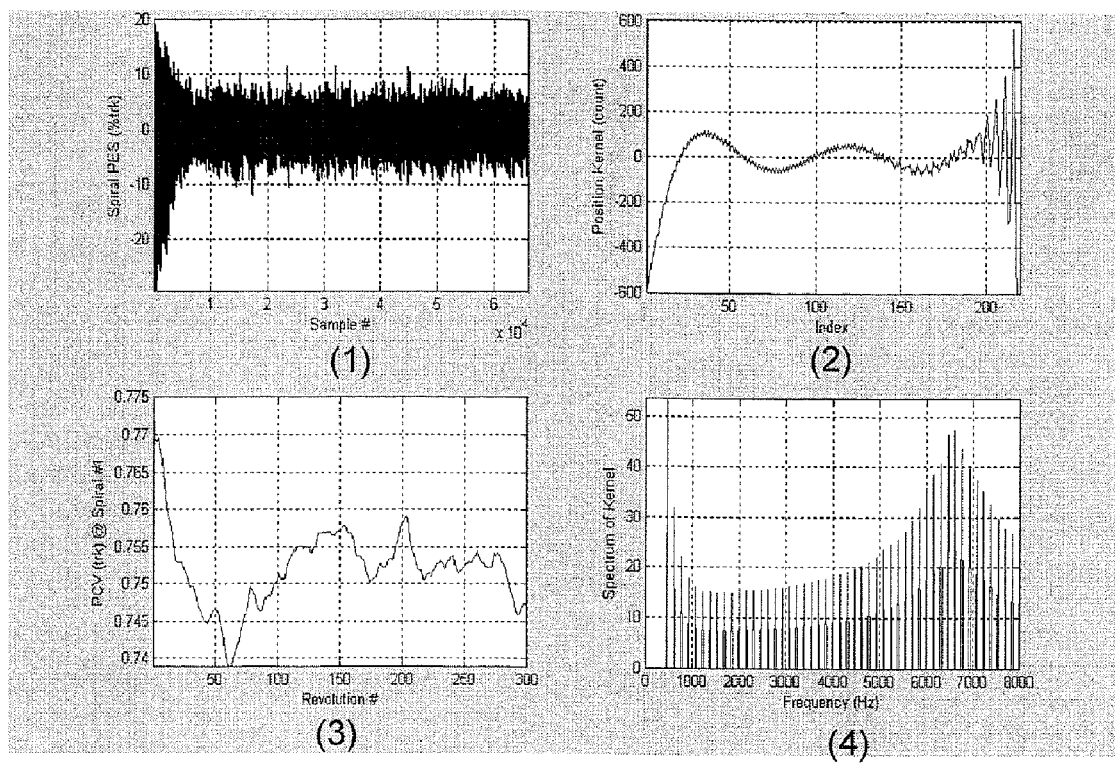
FIG. 12 is a graph of PES values, kernel values, kernel spectrum, and 3F response for a system using a full-length PCV kernel.

FIG. 12 includes a graph [graph (2)] of a full-length kernel 1202, along with a graph [graph (4)] of the spectrum 1204 of the kernel 1202. FIG. 12 also includes a graph [graph (3)] of the timing correction values (PCV) 1203 for a given spiral (Spiral #1) of a disk 34 in response to a 3F disturbance. FIG. 12 also contains a graph of spiral position error signal (PES) versus sample over a number of samples [graph (1)]. As can be seen in graph (3) of FIG. 12, when a 3F disturbance is encountered, the PCV values converge around an average value fairly quickly, within about 100 to 150 samples.

Figure 13A:
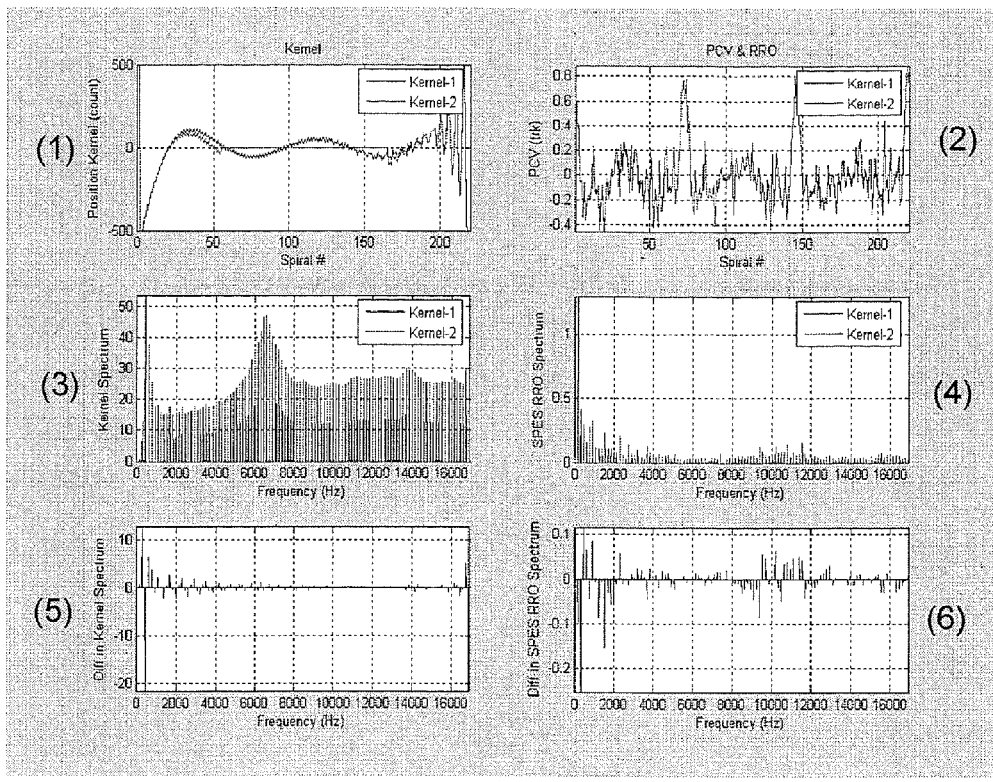
FIG. 13A is a graph of kernel values, PCV values, kernel spectra, PES spectra, difference in kernel spectra and difference in PES spectra for a system using a modified PCV kernel according to some embodiments.
Figure 13B:
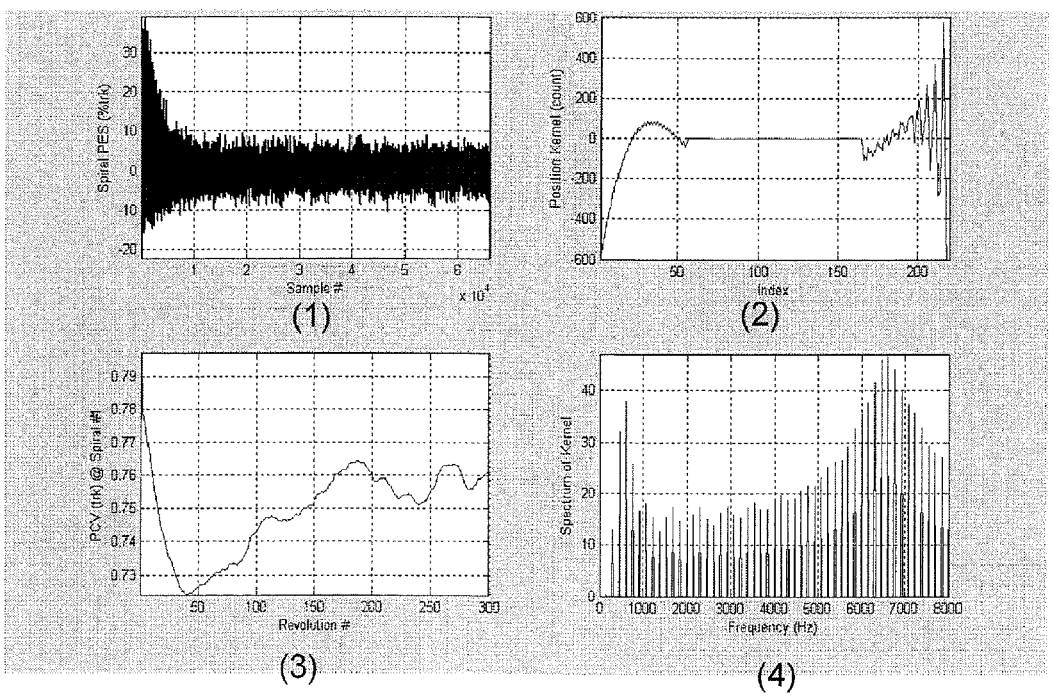
FIG. 13B is a graph of PES values, kernel values, kernel spectrum, and 3F response for the system of FIG. 13A.

As illustrated in FIGS. 13A and 13B, a modified kernel was generated using a cost function-based approach as described above. In the system illustrated in FIGS. 13A and 13B, $I_z$ was set at 2, meaning that the modified kernel was constrained so that the 1F and 2F components of the modified kernel were highly restricted. FIG. 13A includes a graph [graph (1)] of the original kernel 1301A and the modified kernel 1301B. FIG. 13A also includes a graph of PCV values for each spiral generated using the original and modified kernels [graph (2)], a graph of the spectra of the original and modified kernels [graph (3)], a graph of the spectra of PES values obtained using the original and modified kernels [graph (4)], a graph of the difference between the kernel spectra [graph (5)], and a graph of the difference in the PES spectra [graph (6)].

FIG. 13B includes a graph [graph (2)] of the modified kernel 1302, along with a graph [graph (4)] of the spectrum 1304 of the kernel 1302. FIG. 13B also includes a graph [graph (3)] of the timing correction values (PCV) 1303 for a given spiral (Spiral #1) of a disk 34 in response to a 3F disturbance. FIG. 13A also contains a graph of spiral position error signal (PES) versus sample over a number of samples [graph (1)]. As can be seen in graph (3) of FIG. 13B, when a 3F disturbance is encountered, the PCV values converge more slowly than occurred when using the full kernel. Thus, even though the modified kernel 1302 is optimized using the cost function approach subject to the constraints described above, the system may not perform as well in response to certain types of disturbances as a system that uses a full length (non-zeroed) kernel.

In order to find a reduced length kernel that performs at a comparable level as a full-length kernel, a number of variables may be adjusted. For example, the thresholds $\epsilon_i$, $\epsilon_{other}$ and $\delta$ can be adjusted. The length M of the polynomial curve-fitting functions can be adjusted. Also, the starting and ending points ($L_1$, $L_2$) of the zeroed portion of the modified kernel may be adjusted.

Furthermore, the number of frequencies being controlled may be changed (e.g. by increasing $I_z$). For example, it may be difficult to find a modified kernel with acceptable response to a 3F disturbance with $I_z = 2$.

Accordingly, a modified kernel was generated with $I_z = 3$, meaning that the modified kernel was constrained so that the 1F, 2F and 3F components of the modified kernel were highly restricted. In generating the modified kernel, the parameters shown in Table 1 were used.

TABLE 1

| Optimization Parameters | |
| --- | --- |
| Parameter | Value |
| $L_1$ | 71 |
| $L_2$ | 132 |
| M | 5 |
| $\delta$ | 100 |
| $\epsilon_1$ | 2 |
| $\epsilon_2$ | 5 |
| $\epsilon_3$ | 5 |
| $\epsilon_4$ | 20 |
| $\epsilon_{other}$ | 20 |

Figure 14A:
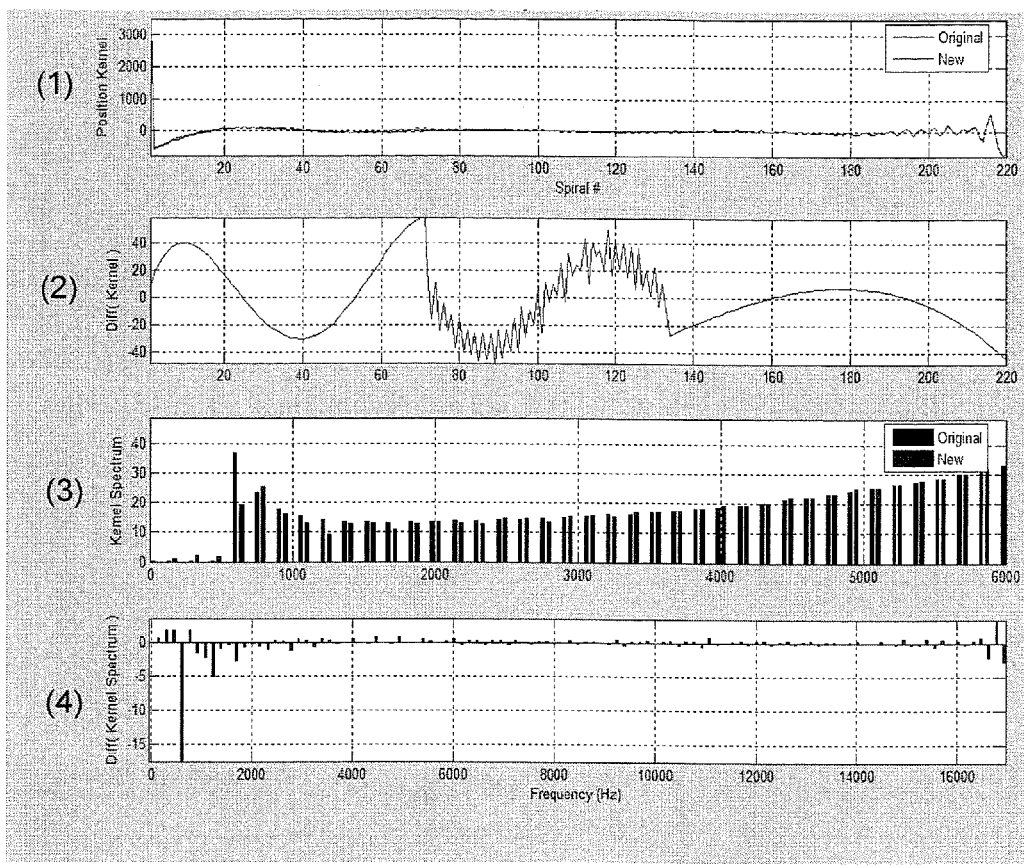
FIG. 14A is a graph of kernel values, PCV values, kernel spectra, PES spectra, difference in kernel spectra and difference in PES spectra for a system using a modified PCV kernel according to some embodiments.

FIG. 14A includes a graph [graph (1)] of the original kernel 1401A and the modified kernel 1401B generated with $I_z = 3$. FIG. 14A also includes a graph of PCV values for each spiral generated using the original and modified kernels [graph (2)], a graph of the spectra of the original and modified kernels [graph (3)], a graph of the spectra of PES values obtained using the original and modified kernels [graph (4)], a graph of the difference between the kernel spectra [graph (5)], and a graph of the difference in the PES spectra [graph (6)].

Figure 14B:
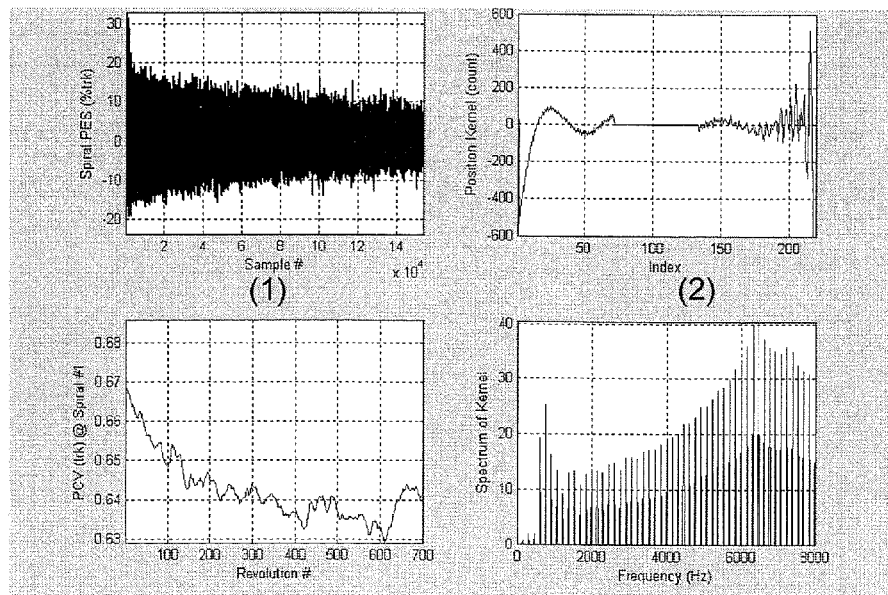
FIG. 14B is a graph of PES values, kernel values, kernel spectrum, and 3F response for the system of FIG. 14A.

FIG. 14B includes a graph [graph (2)] of the modified kernel 1402, along with a graph [graph (4)] of the spectrum 1404 of the kernel 1402. FIG. 14B also includes a graph [graph (3)] of the timing correction values (PCV) 1403 for a given spiral (Spiral #1) of a disk 34 in response to a 3F disturbance. FIG. 14A also contains a graph of spiral position error signal (PES) versus sample over a number of samples [graph (1)]. As can be seen in graph (3) of FIG. 14A, when a 3F disturbance is encountered, the PCV values converge much more slowly than occurred when using the full kernel.

However, the 3F response of the kernel can be dramatically improved by adjusting the parameters used in the cost function optimization. For example, a modified kernel was generated using the optimization parameters shown in Table 2.

TABLE 2

| Optimization Parameters | |
| --- | --- |
| Parameter | Value |
| $L_1$ | 71 |
| $L_2$ | 164 |
| M | 5 |
| $\delta$ | 90 |
| $\epsilon_1$ | 2 |
| $\epsilon_2$ | 5 |
| $\epsilon_3$ | 4 |
| $\epsilon_4$ | 12 |
| $\epsilon_{other}$ | 15 |

Figure 15A:
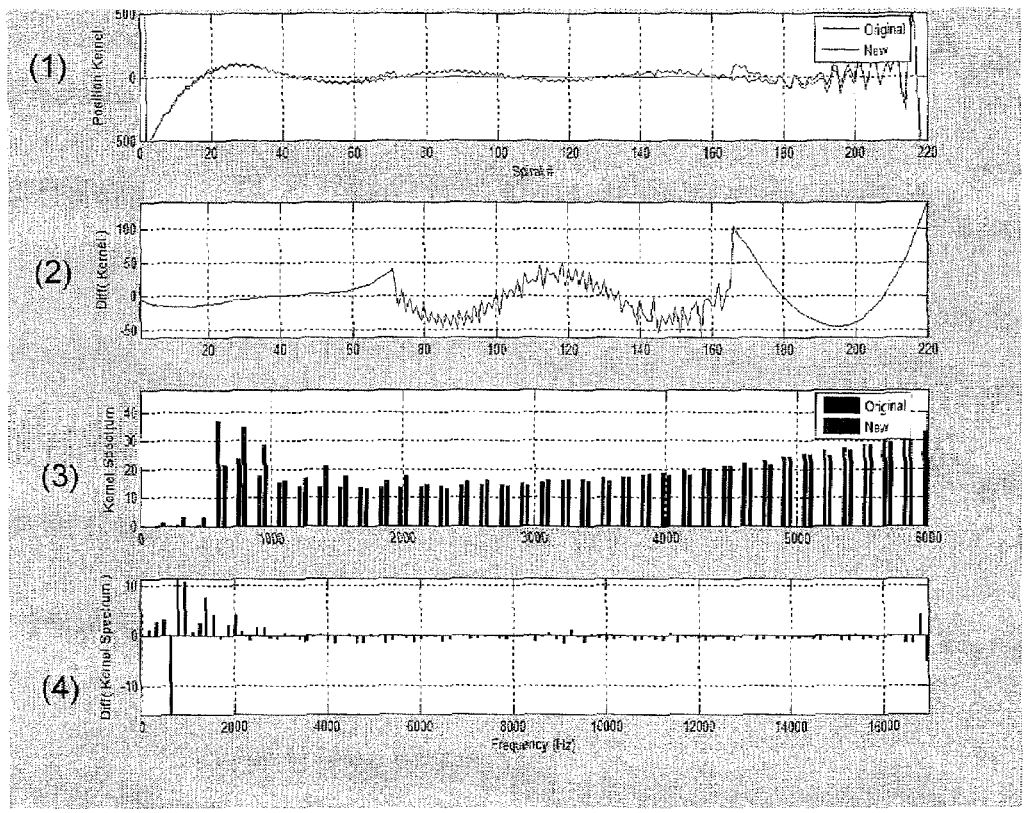
FIG. 15A is a graph of kernel values, PCV values, kernel spectra, PES spectra, difference in kernel spectra and difference in PES spectra for a system using a modified PCV kernel according to some embodiments.

FIG. 15A includes a graph [graph (1)] of the original kernel 1501A and the modified kernel 1501B generated with $I_z = 3$.

FIG. 15A also includes a graph of PCV values for each spiral generated using the original and modified kernels [graph (2)], a graph of the spectra of the original and modified kernels [graph (3)], a graph of the spectra of PES values obtained using the original and modified kernels [graph (4)], a graph of the difference between the kernel spectra [graph (5)], and a graph of the difference in the PES spectra [graph (6)].

Figure 15B:
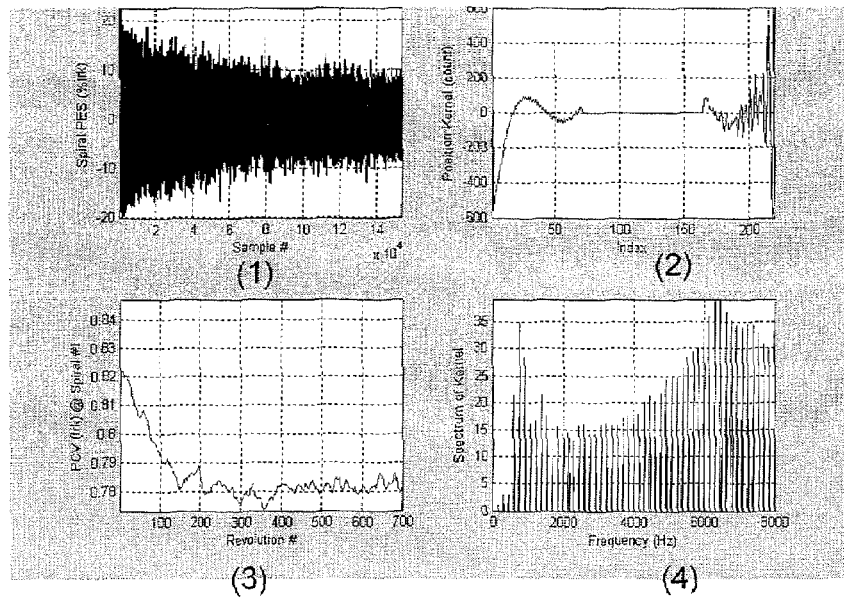
FIG. 15B is a graph of PES values, kernel values, kernel spectrum, and 3F response for the system of FIG. 15A.

FIG. 15B includes a graph [graph (2)] of the modified kernel 1502, along with a graph [graph (4)] of the spectrum 1504 of the kernel 1502. FIG. 15B also includes a graph [graph (3)] of the timing correction values (PCV) 1503 for a given spiral (Spiral #1) of a disk 34 in response to a 3F disturbance. FIG. 15A also contains a graph of spiral position error signal (PES) versus sample over a number of samples [graph (1)]. As can be seen in graph (3) of FIG. 15A, when a 3F disturbance is encountered, the PCV values converge in approximately the same time frame as occurred when using the full kernel.

In addition to examining the performance of a modified kernel in response to a 3F disturbance, it may be desirable to examine the performance in response to higher frequency disturbances. However, the foregoing results demonstrate that when proper optimization parameters are chosen, a reduced-length kernel can be generated that has reasonable performance.

Although some embodiments have been described with respect to the writing of servo fields using spiral reference patterns, it will be appreciated that embodiments may be used to write servo fields using other types of timing reference patterns besides spirals.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method, comprising:
generating a modified phase correction value (PCV) kernel by setting a plurality of values of a full-length PCV kernel to zero;
adjusting at least one non-zero value of the modified PCV kernel to reduce a magnitude of a spectrum of the modified PCV kernel at a selected frequency; and
controlling timing of a phase-locked clock using the modified PCV kernel.

2. The method of claim 1, controlling timing of the phase-locked clock comprises convolving the non-zero values of the PCV kernel with a set of phase errors to obtain a set of PCV values, and adjusting the timing of the phase-locked clock in response to the PCV values.

3. The method of claim 1, wherein adjusting at least one non-zero value of the PCV kernel comprises setting the magnitude of the spectrum of the PCV kernel at the selected frequency to zero, and thereafter re-setting the plurality of values of the PCV kernel to zero.

4. The method of claim 3, further comprising:
measuring the spectrum of the PCV kernel at the selected frequency; and
if the magnitude of the PCV kernel spectrum at the selected frequency is greater than a threshold value, repeating setting the magnitude of the PCV spectrum at the selected frequency to zero, and thereafter re-setting the plurality of values of the PCV kernel to zero.

5. The method of claim 1, further comprising writing servo patterns on a data storage disk using a timing output of the phase-locked clock.

6. The method of claim 1, further comprising adjusting at least one non-zero value of the PCV kernel to reduce the magnitude of the spectrum of the modified PCV kernel at a plurality of selected frequencies.

7. The method of claim 6, wherein the plurality of selected frequencies comprise 1F and 2F frequencies, wherein F represents a fundamental frequency.

8. The method of claim 6, wherein adjusting at least one non-zero value of the PCV kernel comprises setting the magnitude of the spectrum of the PCV kernel at the selected frequencies to zero, and thereafter re-setting the plurality of values of the PCV kernel to zero.

9. The method of claim 8, further comprising:
measuring the spectrum of the PCV kernel at the selected frequencies;
comparing the magnitude of the kernel spectrum at a first of the selected frequencies to a first threshold and comparing the magnitude of the kernel spectrum at a second of the selected frequencies to a second threshold; and
if the magnitude of the PCV kernel spectrum at the first of the selected frequencies is greater than the first threshold or the magnitude of the PCV kernel spectrum at the second of the selected frequencies is greater than the second threshold, repeating setting the magnitude of the PCV spectrum at the selected frequencies to zero, and thereafter re-setting the plurality of values of the PCV kernel to zero.

10. The method of claim 1, wherein adjusting the at least one non-zero value of the modified PCV kernel comprises defining a cost function and adjusting the at least one non-zero value of the modified PCV kernel so as to reduce or minimize the cost function.

11. The method of claim 10, wherein the cost function comprises a term that is proportional to a magnitude of the spectrum of the modified kernel at the selected frequency.

12. The method of claim 10, wherein the cost function comprises a term that is proportional to a difference between the magnitude of the spectrum of the modified kernel and a magnitude of a spectrum of the full-length kernel at the selected frequency.

13. The method of claim 10, wherein adjusting the at least one non-zero value of the modified PCV kernel comprises adjusting the at least one non-zero value of the modified PCV kernel subject to a constraint.

14. The method of claim 13, wherein the constraint comprises a limitation on the magnitude of the spectrum of the modified kernel at the selected frequency.

15. The method of claim 13, wherein the constraint comprises a limitation on the magnitude of the spectrum of the modified kernel at a frequency other than the selected frequency.

16. The method of claim 13, wherein the constraint comprises a limitation on a difference between a value of the modified kernel and a corresponding value of the full-length kernel.

17. The method of claim 10, further comprising adjusting at least one non-zero value of the modified PCV kernel to reduce a magnitude of a spectrum of the modified PCV kernel at a plurality of selected frequencies.

18. The method of claim 17, wherein the plurality of selected frequencies comprises the 1F, 2F and 3F frequencies, where F denotes a fundamental frequency.

19. An apparatus for writing servo fields on a data storage medium, comprising:
a phase locked loop including a clock generator that generates a clock signal, a phase demodulator that generates a phase error signal in response to the clock signal and a reference pattern read signal, a combiner that subtracts a phase control value from the phase error signal to provide an adjusted phase error signal, and a controller that generates a frequency control signal in response to the adjusted phase error signal; and a servo controller that generates the phase control value by convolving phase errors with a PCV kernel having a length that is less than a number of reference patterns on the data storage medium.

20. A method, comprising:

writing servo patterns on a data storage medium including a plurality of timing patterns in response to phase correction values generated using a phase correction value (PCV) kernel having a length that is less than the number of timing patterns on the data storage medium.

* * * * *